United States Patent [19]

Hendricks et al.

[11] Patent Number: 4,737,543

[45] Date of Patent: Apr. 12, 1988

[54] CITRIC ACID DERIVATIVES AS EMULSIFIERS FOR EMULSION POLYMERIZATION

[75] Inventors: Udo W. Hendricks, Odenthal; Adolf Schmidt, Cologne, both of Fed. Rep. of Germany

[73] Assignee: Bayer Aktiengesellschaft, Leverkusen, Fed. Rep. of Germany

[21] Appl. No.: 13,564

[22] Filed: Feb. 11, 1987

[30] Foreign Application Priority Data

Feb. 22, 1986 [DE] Fed. Rep. of Germany ....... 3605799

[51] Int. Cl.$^4$ ............................ C08K 3/20; C08F 2/00
[52] U.S. Cl. .................................. 524/767; 524/774; 524/777; 524/836; 526/211; 526/216
[58] Field of Search ................. 526/211, 216; 524/767, 524/774, 777, 836

[56] References Cited

U.S. PATENT DOCUMENTS 3,740,369  6/1973  Sturt et al. ......................... 526/216
3,997,628  12/1976  Giddings .............................. 525/57
4,663,382  5/1987  Kishida ................................ 524/504

OTHER PUBLICATIONS

McCutcheon's Detergents & Emulsifiers, International Edition, 1976 Annual, p. 1.

Primary Examiner—Joseph L. Schofer
Assistant Examiner—Peter D. Mulcahy
Attorney, Agent, or Firm—Connolly & Hutz

[57] ABSTRACT

Process for the preparation of polymer dispersions with particle diameters of 50 to 1000 nm, wherein there are employed, as emulsifiers for the emulsion polymerization citric acid derivatives of the general formula (I)

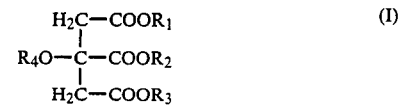

in which, independently of one another, $R_1$, $R_2$ and $R_3$ denote $C_6$–$C_{20}$-alkyl, (including cycloalkyl) hydrogen, sodium, potassium, lithium or ammonium and $R_4$ denotes hydrogen or acetyl, with the proviso that at least one of the radicals $R_1$ to $R_3$ denotes alkyl, and as initiators water-soluble agents which form free radicals or redox systems with at least one water-soluble component.

4 Claims, No Drawings

CITRIC ACID DERIVATIVES AS EMULSIFIERS FOR EMULSION POLYMERIZATION

The invention relates to a process for the preparation of polymer dispersions with particle diameters of 50 to 1000 nm, wherein there are employed, as emulsifiers for the emulsion polymerization citric acid derivatives of the general formula (I)

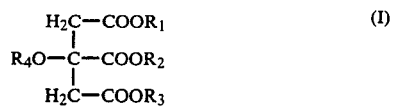

in which, independently of one another, $R_1$, $R_2$ and $R_3$ denote $C_6$–$C_{20}$-alkyl, (including cycloalkyl) hydrogen, sodium, potassium, lithium or ammonium and $R_4$ denotes hydrogen or acetyl, with the proviso that at least one of the radicals $R_1$ to $R_3$ denotes alkyl, and as initiators water-soluble agents which form free radicals or redox systems with at least one water-soluble component.

It is known from German Offenlegungsschrift 1,228,736 that citric acid esters in which at least one carboxyl group is esterified and at least one further carboxyl group is present as the free acid can be used as an additive in coats of oil paint and varnish which prevents sedimentation of pigments.

It is known from German Auslegeschrift 1,224,497 that polyvinyl chloride or vinyl chloride copolymers can be prepared in aqueous suspension using monomer-soluble catalysts and part esters of aliphatic polycarboxylic acids with long-chain aliphatic alcohols with 6 to 20 C atoms, in which at least one carboxyl group should remain non-esterified.

German Auslegeschrift 1,295,815 furthermore claims citric acid esters as suspension auxiliaries for the preparation of polyvinyl chloride or copolymers containing vinyl chloride by suspension polymerization.

The teaching of European Patent Application 36,624 is that esters of hydroxycarboxylic acids with up to 6 C atoms in the alcohol component can be employed in the form of their water-soluble salts as auxiliaries for suspension polymerization of vinyl chloride, if appropriate in combination with conventional protective colloids.

There is a need for auxiliaries for emulsion polymerization which allow latices with mean particle diameters of 150–1000 nm to be prepared by discontinuous polymerization without seed latex and metering processes.

Such latices with particle diameters of about 150 to 1000 nm can be used as graft bases for the preparation of thermoplastic graft polymers. Highly concentrated latices can also be prpared at particle diamters >150 nm.

Methods of producing a highly concentrated polymer latex with large polymer particles which are based on modifying the emulsifier are considered to be of limited use only (compare Houben Weyl, Methoden der oganischen Chemie (Methods of Organic Chemistry), Volume XIV, 1; George Thieme Verlag 1961, page 336 et seq.).

It is said that only emulsifiers based on dimeric linoleic acid are able to produce low-viscosity butadiene/styrene-copolymer latices with large particles.

Thus a company publication by Unilever-Emery N.V. Gouda (NL): "Empol Dimeric and Trimeric Acids, PSB 6911-0105 D, page 20" teaches that the potassium carbonate soap of the "dimeric acid" is a highly effective emulsifier and makes preparation of "unusually large" latex particles possible.

The "dimeric acids" are attributed the structure

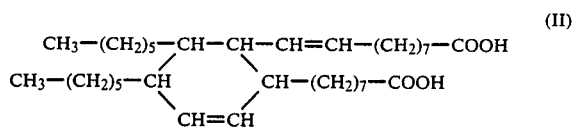

It has now been found that in emulsion polymerization in the presence of water-soluble substances which form free radicals, of compounds which are capable of undergoing free radical polymerization, esters of citric acid and of O-acetylcitric acid the non-esterified acid groups of which can be in the form of alkali metal salts are particularly suitable for the preparation of polymer dispersions, especially for the preparation of dispersions (latices) with particles having mean diameters of 150 to 1000 nm.

The reaction of citric acid (III)

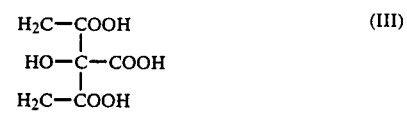

with an alkanol can yield simultaneously a large number of reaction products. Even such chemically non-uniform reaction products of citric acid and of O-acetylcitric acid are suitable as emusifiers of preparing latices having large particles and a narrow particle diameter distribution.

The triesters, obtainable by complete esterification of citric acid and of O-acetylcitric acid, with $C_7$–$C_{20}$-alkanols, which can be straight-chain, branched or cycloaliphatic, are readily soluble in the compounds capable of free radical polymerization i.e. the monomers. On intensive stirring and provided the continuous phase of the emulsion is rendered alkaline, improved emulsification of the monomers is observed after some time, especially at temperatures above 60° C., which is followed by the onset of a polymerization reaction provided suitable catalysts are present.

Large particle size dispersions are formed by this process (slow polymerization). The particle diameters can be up to 1,000 nm.

Polymer dispersions having smaller particles are formed if the emulsifiers used are obtained by reaction of 1 mol of citric acid, citric anhydride or O-acetylcitric anhydride with 2 mols of an alkanol and subsequent careful neutralization of the acidic ester formed with sodium hydroxide solution, potassium hydroxide solution, lithium hydroxide solution or other bases. Other bases can be ammonia, amines, amino-alcohols or other organic nitrogen bases.

Sodium hydroxide solution, potassium hydroxide solution or ammonia solution are preferably employed as the base.

The above alkali metal and ammonium salts of the acid citric acid esters or O-acetylcitric acid esters are used to prepare dispersion (latices) with particle diameters of 150 to 500 nm.

Latices with even smaller particles are formed with emulsifiers which are salts of acidic citric acid esters or O-acetylcitric acid esters obtained by reaction of 1 mol of citric acid, citric anhydride or O-acetylcitric anhydride with 1 mol of an alkanol with at least 10 C atoms. $C_{10-18}$-alkanols or mixtures of these are preferably employed. The alkanols can be straight-chain, branched or cyclic. The remaining hydroxyl groups are, of course, mentioned as described above.

The preparation of O-acetylcitric anhydride from citric acid and acetic anhydride is known (for example British Pat. No. A-674,710), as in the preparation of citric anhydride (J. Pharm. Sci. 58, 505 (1969)).

Preferably, citric acid itself is reacted with alcohols.

The esterification of citric acid with alcohols is known. In principle, the alkanols can act on the citric acid in undiluted form when the water of reaction is removed.

It is also possible to carry out the esterification with azeotropic removal of the water with the aid of a suitable entraining agent, such as toluene.

Catalysts which can be used are, for example, sulphuric acid, p-toluenesulphonic acid, p-dodecylbenzenesulphonic acid or an acid ion exchanger resin. The reaction products, which melt at temperature above 20° C., usually have a waxy consistency. They can be neutralized in aqueous emulsion at elevated temperature, but also under mild conditions dissolved in a suitable solvent, such as, for example, isopropanol, after which the solvent is removed and the emulsifier remains as a paste.

Particular advantages of the emulsifiers according to the invention are, in addition to the narrow size distribution of the latex particles, their good biological degradability, their low tendency to foam and their good physiological tolerability.

The emulsifiers according to the invention are employed for the emulsion polymerization with water-soluble agents which form free radicals. Examples of suitable water-soluble agents which form free radicals are the peroxodisulphate of potassium, ammonium and sodium, salts of peracetic acid or of perpropionic acid or potassium peroxodiphosphate in combination with reducing agents, such as sulphites, or, in particular, also water-soluble azo compounds with the following structure:

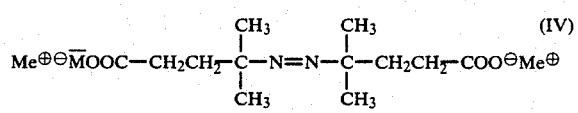

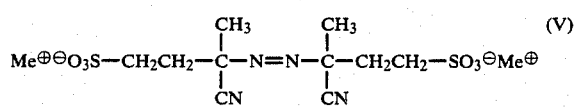

$$Me^\oplus = Na^\oplus, K^\oplus, NH_4^\oplus.$$

The substantial uniformity in particle diameters already achieved by using water-soluble initiators can be improved further if the reaction is carried out with combinations of highly stable monomer-soluble peroxides, such as cumene hydroperoxide or p-menthane hydroperoxide, and water-soluble highly reducing compound, such as sodium formaldehyde-sulphoxylate in the presence of traces of heavy metals, for example complex compounds of iron.

It is also possible to use monomer-soluble reducing compounds in combinations with water-soluble peroxides in the presence of traces of heavy metals as initiators for the emulsion polymerization with the citric acid emulsifiers.

The polymerization can be carried out in the temperature range from +5° to 80° C. with all the emulsifier taken. If a polymerization temperature of >80° C. is desired, it is advisable not to take all the emulsifier, but subsequently to meter the majority of the emulsifier in during the polymerization. At the same time, an additional emulsifier, for example, an alkyl monosulphonate with a medium chain length of 14 C atoms, should also be used as these extreme temperatures.

Compounds capable of undergoing radical polymerization, i.e. monomers which can be polymerized according to the invention in the presence of the citric acid derivatives are emulsifiers are, for example, butadiene, isoprene, chloroprene, ethylene, styrene, methyl acrylate, ethyl acrylate, n-butyl acrylate, ethylhexyl acrylate, methyl methacrylate, butyl methacrylate, vinyl acetate, vinyl propionate and vinyl versate, in combination with other monomers, such as α-methylstyrene, acrylonitrile and methacrylonitrile.

Butadiene is the particularly preferred monomer, optionally combined with copolymerized monomers.

In addition to the monomers mentioned, for stabilization of the organic colloid particles the customary auxiliary monomers for this purpose can be copolymerized in a known manner. These auxiliary monomers in addition also have the function of improving the adhesion or pigment-binding capacity in film-forming dispersions. Such auxiliary monomers are, for example, acrylic acid, methacrylic acid, acrylamide, methacrylamide, vinylsulphonic acid, methallylsulphonic acid, maleic acid, fumaric acid, itaconic acid, half-esters of maleic acid and salts thereof. The auxiliary monomers are employed, if appropriate, in amounts of up to not more than 6% by weight, based on the polymer.

In addition to the monomers mentioned, monomers containing crosslinking groups can be copolymerized in a manner which is known per se.

The emulsifiers according to the invention can also be combined with other conventional anionic emulsifiers.

It is also possible to combine citric acid emulsifiers with non-ionic emulsifiers.

According to the invention, polybutadiene latices are preferably prepared, and are used as the base for grafting with other monomers.

The solids content of the latices is usually between 30 and 50% by weight, but in principle it is also possible for latices with solids contents of up to 60% by weight to be prepared according to the invention.

The percentages quoted below relate to percentages by weight, unless expressly indicated otherwise.

For the meaning of the abbreviations used for stating the particle diameters, see DIN 53,206.

EXAMPLES

Example 1

Molar ratio of citric acid to 2-ethylhexan-1-ol = 1:2

(A) 210 parts by weight of citric acid hydrate are heated at 160° C., together with 260 parts by weight of 2-ethylhexan-1-ol under a nitrogen atmosphere, the water being distilled off. The splitting off of water has ended after 2 hours. 408 parts by weight of a yellow viscous liquid with a refractive index $n_D^{20}$ of 1.4605, an acid number of 156 mg of KOH/g and a saponification number of 412 mg of KOH/g are obtained.

200 parts by weight of the ester mixture obtained in this manner are mixed with 65 parts by weight of isopropanol and the mixture is neutralized with a mixture of 49.6 parts by weight of 45% strength sodium hydroxide solution and 70 parts by weight of water at 40° to 45° C. A clear solution with a dry matter content of 56% by weight is obtained. The isopropanol is distilled off in vacuo.

(B) The following substances are introduced into a stainless steel stirred autoclave with automatic temperature control and a blade stirrer (150 minute$^{-1}$), with exclusion of atmospheric oxygen:

| | |
|---|---|
| deionized water | 2,030.0 parts by weight |
| 10% strength by weight emulsifier Solution | 547.0 parts by weight |
| tert.-dodecylmercaptan | 5.7 parts by weight |
| butadiene | 1,830.0 parts by weight |

The mixture is heated to 65° C., after which 150 parts by weight of a 2.5% strength by weight potassium persulphate solution are metered in, this temperature being maintained.

The pH value is brought to about 8.5 occasional addition of dilute sodium hydroxide solution. After 55 hours, the autoclave is cooled and let down, and the latex has a solids content of 37% by weight.

Investigation of the latex (ultracentrifuge measurement) gave the following integral particle diameter distribution with Mil correction:

| Masses (%) | D[nm] |
|---|---|
| 0 | 98 |
| 10 | 167 |
| 20 | 249 |
| 30 | 255 |
| 40 | 258 |
| 50 | 264 |
| 60 | 271 |
| 70 | 274 |
| 80 | 276 |
| 90 | 283 |
| 100 | 307 |

DAN: 196; DAF: 242; DAV: 254; DAV:DAN = 1.3.

Example 2

Molar ratio of citric acid to dodecan-1-ol=1:2.

(A) 105 parts by weight of citric acid hydrate are heated at 160° to 170° C. with 186 parts by weight of dodecan-1-ol under a nitrogen atmosphere, 22 parts by weight of water distilling off in the course of 2 hours. The mixture is then heated at 140° C. in vacuo (about 20 mbar) for a further hour.

264 parts by weight of a residue which is solid at room temperature and has a melting range from 32° to 40° C., an acid number of 103 mg of KOH/g and a saponification number of 324 mg of KOH/g are obtained.

100 parts by weight of this product are dissolved in 30 parts by weight of isopropanol and the solution is neutralized with 16.2 parts by weight of a 45% strength sodium hydroxide solution at 40° to 45° C. The mixture is then evaporated in vacuo (about 20 mbar) at 50° C. 52 parts by weight of the citric acid emulsifier are obtained in the form of a white paste.

(B) Polymerization is carried out analogously to Example 1(B) using a 10% strength by weight aqueous solution of the emulsifier prepared under 2(A). A latex with the following particle diameter distribution results:

| Masses (%) | D[nm] |
|---|---|
| 0 | 164 |
| 10 | 207 |
| 20 | 211 |
| 30 | 213 |
| 40 | 215 |
| 50 | 218 |
| 60 | 220 |
| 70 | 224 |
| 80 | 230 |
| 90 | 266 |
| 100 | 1039 |

DN: 163; DAF: 230; DAV: 243; DAV:DAN = 1.5.

Example 3

(A) Citric acid emulsifier prepared from 1 mol of citric acid and 2 mol of dodecan-1-ol analogously to Example 2(A).

(B) The following substances are introduced into a stirred autoclave (analogously to Example 1B), with exclusion of atmospheric oxygen:

| | |
|---|---|
| deionized water | 10,535.0 parts by weight |
| sodium bicarbonate | 10.0 parts by weight |
| aqueous 15% strength solution of the emulsifier prepared according to A | 1,600.0 parts by weight |
| tert.-dodecylmercaptan | 37.2 parts by weight |
| butadiene | 12,000.0 parts by weight |

The mixture is heated to 70° C., while stirring with a blade stirrer (150 revolutions minute$^{-1}$). An aqueous initiator solution which has been prepared by stirring 35.7 parts by weight of 4,4-azo-bis(4-cyanopentanoic acid) with 500 parts by weight of water and subsequently adding 116.4 parts by weight of 10% strength potassium hydroxide solution is then added.

After a reaction time of 40 hours, a latex with the following particle size distribution is obtained:

| Masses (%) | D[nm] |
|---|---|
| 0 | 86 |
| 10 | 124 |
| 20 | 147 |
| 30 | 183 |
| 40 | 221 |
| 50 | 227 |
| 60 | 229 |
| 70 | 236 |
| 80 | 270 |
| 90 | 290 |
| 100 | 350 |

DAN: 169; DAF: 205; DAV: 222, DAV:DAN = 1.3.

The thinly liquid latex is free from coagulate, its solids content is 51% by weight and the pH value is 8.5. The viscosity is 700 centipoise (spindle 1; 6 revolutions minute$^{-1}$ in a Brookfield viscometer).

Example 4

Molar ratio of citric acid to dodecan-1-ol=1:3.

(A) 105 parts by weight of citric acid hydrate are heated at 160° to 170° C. with 279 parts by weight of dodecan-1-ol for 4 hours, the water of reaction formed being distilled off. The mixture is then heated at 140° C. in vacuo (20 mbar) for 1 hour. 350 parts by weight of a waxy residue with an acid number of 19 mg of KOH/g are obtained.

(B) The following substances are introduced into an autoclave analogously to Example 1(B):

| | |
|---|---|
| deionized water | 2,032.0 parts by weight |
| sodium bicarbonate | 2.7 parts by weight |
| 10% strength by weight potassium hydroxide solution | 4.4 parts by weight |
| 10% strength by weight emulsion of the citric acid emulsifier prepared according to 4A | 547.0 parts by weight |
| tert.-dodecylmercaptan | 5.7 parts by weight |
| butadiene | 1,830.0 parts by weight |

When the reaction temperature of 65° C. has been reached, 170 parts by weight of a 2.5% strength by weight potassium persulphate solution are added. The pH value is kept at about 11.5. After 85 hours, the latex reaches a solids content of 37% by weight. The following particle diameter distribution results:

| Masses (%) | D[nm] |
|---|---|
| 0 | 95 |
| 10 | 118 |
| 20 | 170 |
| 30 | 230 |
| 40 | 310 |
| 50 | 340 |
| 60 | 350 |
| 70 | 368 |
| 80 | 390 |
| 90 | 412 |
| 100 | 522 |

DAN: 146; DAF: 246; DAV: 305; DAV:DAN = 2.1.

Example 5

Molar ratio of citric acid to octadecanol = 1:2.

(A) 105 parts by weight of citric acid hydrate are heated at 160° C. with 270 parts by weight of octadecan-1-ol for 4 hours, the water formed being distilled off. The reaction mixture is then heated at 140° C. in vacuo (20 mbar) for a further hour. 315 parts by weight of a substance which is waxy at 20° C. and has an acid number of 75 mg of KOH/g and a saponification number of 237 mg of KOH/g are obtained. Octadecanol was no longer detectable in the reaction mixture by thin layer chromatography.

The acid ester is dissolved in equal parts of isopropanol and the solution is neutralized with 45% strength sodium hydroxide solution. The reaction mixture is then evaporated to constant weight in vacuo (20 mbar) at 50° C. A 10% strength aqueous emulsion is prepared from the residue.

(B) Analogously to Example 1(B), polymerization of the mixture described there is carried out, but using 547.0 parts by weight of the emulsion prepared under 5(A). After a reaction time of 30 hours, a 37% strength latex with the following particle diameter distribution results:

| Masses (%) | D[nm] |
|---|---|
| 0 | 142 |
| 10 | 157 |
| 20 | 163 |
| 30 | 167 |
| 40 | 170 |
| 50 | 173 |
| 60 | 175 |
| 70 | 179 |
| 80 | 185 |
| 90 | 245 |
| 100 | 885 |

DAN: 173; DAF: 183; DAV: 201; DAV:DAN = 1.16.

Example 6

Molar ratio of citric acid to cyclohexanol = 1:2.

(A) 105 parts by weight of citric acid hydrate are heated at 160° to 170° C. with 100 parts by weight of cyclohexanol for 4 hours, the water of reaction being distilled off. The reaction mixture is then heated at 140° C. in vacuo (20 mbar) for 1 hour.

The oily reaction mixture has an acid number of 245 mg of KOH/g and a saponification number of 508 mg of KOH/g. It is dissolved in isopropanol and the solution is neutralized with 45% strength sodium hydroxide solution, after which the mixture is evaporated to constant weight in vacuo (20 mbar) at 50° C. A 10% strength aqueous solution is prepared from the residue.

(B) Polymerization is carried out analogously to Example 1(B) using the 10% strength solution of the emulsifier prepared under 6(A). After a polymerization time of 80 hours, a 37% strength latex with the following particle diameter distribution results:

| Masses (%) | D[nm] |
|---|---|
| 0 | 256 |
| 10 | 257 |
| 20 | 264 |
| 30 | 271 |
| 40 | 283 |
| 50 | 300 |
| 60 | 325 |
| 70 | 351 |
| 80 | 381 |
| 90 | 461 |
| 100 | 644 |

DAN: 304 nm; DAF: 328 nm; DAV: 347 nm; DAV/DAN = 1.14

The latex is outstandingly suitable as a graft base for the preparation of ABS.

Example 7

Molar ratio of citric acid to hexadecan-1-ol = 1:2.

(A) 105 parts by weight of citric acid hydrate are heated at 160° to 170° C. with 242 parts by weight of hexadecan-1-ol for 4 hours, the water of reaction being distilled off. The reaction mixture is then heated at 140° C. in vacuo (20 mbar) for a further hour.

The reaction product has an acid number of 88 mg of KOH/g and a saponification number of 260 mg of KOH/g. It is dissolved, as a melt, in isopropanol 1:1 and the solution is neutralized with 45% strength sodium hydroxide solution, after which the mixture is evaporated to dryness in vacuo. The dry residue is stirred with water to give a 10% strength emulsion.

(B) Polymerization is carried out analogously to Example 1(B), using the 10% strength emulsion prepared under 7(A). After 45 hours, a 35% strength latex with the following particle diameter distribution results:

| Masses (%) | D[nm] |
|---|---|
| 0 | 80 |
| 10 | 111 |

-continued

| Masses (%) | D[nm] |
|---|---|
| 20 | 175 |
| 30 | 181 |
| 40 | 183 |
| 50 | 184 |
| 60 | 185 |
| 70 | 187 |
| 80 | 192 |
| 90 | 204 |
| 100 | 238 |

DAN: 149; DAF: 173; DAV: 180; DAV/DAN = 1.2

Example 8

Molar ratio of citric acid to octan-1-ol=1:2. (A) 105 parts by weight of citric acid hydrate, 400 parts by weight of toluene, 130 parts by weight of octan-1-ol and 0.5 part by weight of p-toluenesulphonic acid are heated, using a water separator and with stirring, until no further water can be removed from the circulation. The reaction mixture is concentrated at 50° C. in vacuo (20 mbar), until no further toluene passes over. The oil which remains is shirred with 500 parts by weight of water and the mixture is brought, with 20% strength potassium hydroxide solution, to pH 8 and a solids content of 10% by weight. An emulsion results.

(B) Polymerization is carried out analogously to Example 1(B), using the emulsifier emulsion prepared under 8(A). After 23 hours, a 40% strength latex with the following particle diameter distribution results:

| Masses (%) | D[nm] |
|---|---|
| 0 | 72 |
| 10 | 85 |
| 20 | 117 |
| 30 | 157 |
| 40 | 162 |
| 50 | 165 |
| 60 | 168 |
| 70 | 171 |
| 80 | 173 |
| 90 | 177 |
| 100 | 202 |

DAN: 117; DAF: 144; DAV: 154; DAV:DAN = 1.3.

Example 9

(A) 327 parts by weight of citric acid hydrate are finely powdered and the powder is spread on an enamelled sheet and dried in a vacuum drying cabinet (10 mm Hg) at 115° C. over anhydrous calcium chloride for 26 hours. The weight loss is 27 parts by weight after 3 hours and 29 parts by weight after 26 hours.

298 parts by weight of this anhydrous citric acid are powdered and warmed to 50° C. with 317 parts by weight of acetic anhydride and 0.1 part by weight of p-toluenesulphonic acid, with stirring. After 15 minutes, a clear solution is formed, and this is kept at 80° C. for 1 hour. The solution is then concentrated at 50° C., first under a waterpump vacuum and then under an oil pump vacuum (2 mm Hg).

335 parts by weight of a transparently glassy, slightly browned residue remain. This crude O-acetylcitric anhydride is reacted directly with alcohols without further purification.

For example, 110 parts by weight of crude O-acetylcitric anhydride are warmed to 90° C. with 110 parts by weight of tetradecan-1-ol (myristyl alcohol), while stirring. After an exothermic reaction starts, which can be accelerated by addition of catalytic amounts of a tertiary amine, the clear melt is cooled to 80° C. and is subsequently stirred for 6 hours.

While still hot, the melt is poured onto an enamelled sheet or into a polyethylene trough, where it solidifies to a crystal sludge on cooling.

43 parts by weight of the crude O-acetylcitric acid monotetradecyl ether are dissolved in 484 parts by weight of water with 11 parts by weight of potassium hydroxide.

(B) Polymerization is carried out analogously to Example 1(B) using a 10% strength solution of the emulsifier prepared according to Example 9(A). After a polymerization time of 15 hours, a coagulate-free 40% strength latex with an average particle diameter of 70 nm results.

Example 10 (Comparison Example)

45.7 parts by weight of a commercially available dimeric acid (®EMPOL 1014 or ®EMPOL 1010, UNILEVER EMERY N.V. Gouda, Holland) are stirred with 10.6 parts by weight of 85% strength potassium hydroxide solution and 490 parts by weight of water and dissolved and the solution is then diluted with 2,030 parts by weight of water.

5.7 parts by weight of tert.-dodecylmercaptan are emulsified in this emulsifier solution, the emulsion is introduced into a stainless steel autoclave according to Example 1(B), 1,830 parts by weight of butadiene are forced in analogously to Example 1(B) and the emulsion polymerization is carried out at 65° C. with 150 parts by weight of a 2.5% strength potassium persulphate solution.

After 12 hours, a coagulate-free 40% strength latex with the following particle size distribution results:

| Masses (%) | D (nm) |
|---|---|
| 0 | 33 |
| 10 | 39 |
| 20 | 45 |
| 30 | 50 |
| 40 | 55 |
| 50 | 60 |
| 60 | 65 |
| 70 | 72 |
| 80 | 80 |
| 90 | 86 |
| 100 | 1197 |

DAN: 50 nm; DAF: 58 nm; DAV: 66 nm; DAV:DAN = 1.3

The comparison experiment demonstrates that the polybutadiene latex prepared with the aid of dimeric acids cannot be called "particularly coarse-particled". If the amount of emulsifier is drastically reduced to one-sixth of the amount used above, a latex containing 42 parts by weight of coagulate forms. After sieving of the coagulate, the following particle size distribution is found:

| Masses (%) | D [nm] |
|---|---|
| 0 | 51 |
| 10 | 61 |
| 20 | 66 |
| 30 | 70 |
| 40 | 74 |
| 50 | 77 |
| 60 | 81 |
| 70 | 86 |

| Masses (%) | D [nm] |
|---|---|
| 80 | 91 |
| 90 | 99 |
| 100 | 1300 |

DAN: 73 nm; DAF: 78 nm; DAV: 86 nm; DAV:DAN = 1.2.

In spite of the considerable reduction in the amount of emulsifier, the average particle size is still far below that achieved with the aid of the emulsifiers according to the invention, and is at the most to be compared with that of the reaction products of 1 mol of citric acid with 1 mol of a long-chain unbranched alcohol.

We claim:

1. Process for the preparation of polymer dispersions with particle diameters of 50 to 1000 nm, wherein there are employed, as emulsifiers for the emulsion polymerization citric acid derivatives of the general formula (I)

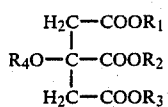

(I)

in which, independently of one another, $R_1$, $R_2$ and $R_3$ denote $C_6$–$C_{20}$-alkyl, (including cycloalkyl) hydrogen, sodium, potassium, lithium or ammonium and $R_4$ denotes hydrogen or acetyl, with the proviso that at least one of the radicals $R_1$ to $R_3$ denotes alkyl, and as initiators water-soluble agents which form free radicals or redox systems with at least one water-soluble component.

2. A process according to claim 1, in which butadiene or a mixture thereof with compound(s) which can be copolymerised with butadiene, is subjected to emulsion polymerization.

3. A process according to claim 1, in which the compound subjected to emulsion polymerization is selected from isoprene, chloroprene, ethylene, styrene, methyl acrylate, ethyl acrylate, n-butyl acrylate, ethylhexyl acrylate, methyl methacrylate, butyl methacrylate, vinyl acetate, vinyl propionate and vinyl versate, in combination with α-methylstyrene, acrylonitrile and methacrylonitrile.

4. A process according to claim 1, in which the compound subjected to emulsion polymerization is present in a mixture with up to 6% by weight, based on the polymer, of an auxiliary monomer selected from acrylic acid, methacrylic acid, acrylamide, methacrylamide, vinylsulphonic acid, methallylsulphonic acid, maleic acid, fumaric acid, itaconic acid, half-esters of maleic acid and salts thereof and half-esters of itaconic acid and salts thereof.

* * * * *